UNITED STATES PATENT OFFICE.

WILLIAM BUTTS, OF PETALUMA, CALIFORNIA.

PREPARING BEANS, PEASE, &c., FOR FOOD.

SPECIFICATION forming part of Letters Patent No. 226,712, dated April 20, 1880.

Application filed May 9, 1879.

*To all whom it may concern:*

Be it known that I, WILLIAM BUTTS, of the city and county of San Francisco, and State of California, have invented an Improved Method of Preparing Beans, &c., for Food; and I hereby declare the following to be a full, clear, and exact description thereof.

The object of my invention is the preparation of those descriptions of vegetable alimentary substances which are gathered and stored in a dry state, such as beans, pease, lentils, &c., in order to preserve them unchanged in their nature for an indefinite period, and to render them at the same time available for use without the necessity of consuming much time or fuel in preparing for the table.

The beans or vegetables of a corresponding dry nature are first soaked in water for a short time, so as to cause them to be easily acted upon by steam, which is applied to them in a chamber. They are then removed from the chamber and dried. The drying process completed, they are suitably packed, ready for immediate use at any time after a few moments cooking.

To prepare the beans, pease, lentils, and similar vegetables which are obtained in a dry state, I first soak them for a short time in clean water. This softens the outer integument and renders the interior more or less soft in its nature. Removing the beans from the preliminary bath, I place them in a close chamber, into which I introduce steam, the beans being suitably spread on trays, so that each one will feel the effects of the steam. This steam-chest or steamer may be of any desired shape, size, or character.

The length of time during which the beans or pease are left to the action of the steam depends on their hardness and age and the pressure of the steam.

The previous soaking of the beans puts them in a fit state to be quickly acted upon by the steam, so that it reduces them to such a condition that they may, when required for use, be cooked in a short time. They will be subjected to this action of steam for from one to two hours, according to the circumstances. During this operation the beans become swollen and soft or pulpy.

When sufficiently steamed I remove the beans from the steam-chamber and place them in a drying-chamber, where they are kiln-dried by means of heated air. This drying process again reduces the beans to their original size by removing all the water by evaporation. Many of them will break open, after the manner of corn which has been popped. When dried in this way the beans are ready for the market, and can be packed in bags or boxes in the ordinary way.

It will be evident that the same result as regards softening may be accomplished, as far as the appearance is concerned, by parboiling the beans in water instead of steam. I prefer, however, to apply the steam, since, when softened in hot water and removed from it, about fifteen to twenty per cent. of the nutritive material will remain in the water and thus be lost. When acted on by the steam, however, none of the nutritive qualities are lost.

Beans, pease, &c., thus prepared will require only a short cooking to prepare them for the table, and there is less danger of burning them than when the raw bean is cooked without such preliminary treatment.

The raw beans require several hours of steady heat and frequent stirring to properly prepare them for food; but beans prepared as I have stated require no more time or attention to render suitable for table than does any ordinary article of food, and they are improved in flavor by this treatment.

Whenever large bodies of men are to be fed, such as in the army or navy, these prepared beans and pease are extremely useful, since they are quickly cooked and may be preserved for an indefinite time.

This preparation also especially adapts them to be used on shipboard and for troops in military campaigns when economy of fuel is necessary.

I am aware that it is not new to prepare articles of food of the class to which my invention relates by thoroughly cooking and then drying and crushing, and I do not claim the process of cooking such articles and then drying them, my invention relating especially to the preparation of beans and pease to bring them into such condition that they can be prepared for the table in the ordinary form in which they are served, entire or nearly so, with only a slight amount of cooking.

What I claim, therefore, as my invention is—

The process of preparing beans and pease herein described, consisting in first soaking the same in cold water, then softening the legume by steam or hot water, and finally desiccating the same without disintegration by crushing.

In witness whereof I hereunto set my hand and seal.

WM. BUTTS. [L. S.]

Witnesses:
W. FLOYD DUCKETT,
W. F. CLARK.